(12) United States Patent
Flanders et al.

(10) Patent No.: US 6,608,711 B2
(45) Date of Patent: Aug. 19, 2003

(54) SILICON ON INSULATOR OPTICAL MEMBRANE STRUCTURE FOR FABRY-PEROT MOEMS FILTER

(75) Inventors: Dale C. Flanders, Lexington, MA (US); Peter S. Whitney, Lexington, MA (US); Michael F. Miller, Hollis, NH (US)

(73) Assignee: Axsun Technologies, Inc., Billerica, MA (US)

( * ) Notice: Subject to any disclaimer, the term of this patent is extended or adjusted under 35 U.S.C. 154(b) by 0 days.

(21) Appl. No.: 09/734,420

(22) Filed: Dec. 11, 2000

(65) Prior Publication Data

US 2002/0018385 A1 Feb. 14, 2002

Related U.S. Application Data

(63) Continuation-in-part of application No. 09/649,168, filed on Aug. 25, 2000, now Pat. No. 6,373,632.
(60) Provisional application No. 60/186,780, filed on Mar. 3, 2000.

(51) Int. Cl.[7] .............................................. G02B 26/00
(52) U.S. Cl. ........................ 359/224; 359/224; 359/578
(58) Field of Search ................................ 359/578, 579, 359/223, 224, 225, 290, 291; 356/506, 519, 454

(56) References Cited

U.S. PATENT DOCUMENTS

| | | | | |
|---|---|---|---|---|
| 4,203,128 A | * | 5/1980 | Guckel et al. ............ | 137/831 |
| 5,022,745 A | * | 6/1991 | Zayhowski et al. ........ | 359/847 |
| 5,170,283 A | * | 12/1992 | O'Brien et al. ............ | 359/291 |
| 5,550,373 A | * | 8/1996 | Cole et al. ............... | 250/338.1 |
| 5,589,689 A | * | 12/1996 | Koskinen ................ | 250/338.1 |
| 5,835,216 A | * | 11/1998 | Koskinen ................ | 356/519 |
| 5,999,306 A | * | 12/1999 | Atobe et al. ............. | 359/295 |
| 6,078,395 A | * | 6/2000 | Jourdain et al. .......... | 356/519 |
| 6,201,629 B1 | * | 3/2001 | McClelland et al. ....... | 359/223 |

FOREIGN PATENT DOCUMENTS

| | | | |
|---|---|---|---|
| EP | 0 417 523 | 3/1991 | ........ G02B/26/08 |
| EP | 0 419 853 | 4/1991 | ........ G02B/26/08 |
| EP | 0 689 078 | 12/1995 | ........ G02B/26/08 |
| WO | 97/02506 | 1/1997 | ........ G02B/26/08 |

OTHER PUBLICATIONS

Aratani, K.; French, P.J.; Sarro, P.M.; Poenar, D.; Wolffenbuttel, R.F.; and Middelhoek, S., "Surface Micromachined Tuneable Interferometer Array," Sensors and Actuators A, vol. 43 (1994) pp. 17–23.

Dehé, A.; Peerlings, J.; Pfeiffer, J.; Riemenschneider, R.; Vogt, A.; Streubel, K.; Kunzel, H.; Meissner, P.; and Hartnagel, H.L., "III–V Compound Semiconductor Micromachined Actuators for Long Resonator Tunable Fabry–Perot Detectors," Sensors and Actuators A, vol. 68 (1998) pp. 365–371.

(List continued on next page.)

Primary Examiner—John Juba
(74) Attorney, Agent, or Firm—J. Grant Houston

(57) ABSTRACT

A process for fabricating an optical membrane device comprises providing a handle wafer and then oxidizing a surface of the handle wafer to form an insulating layer. A device wafer is then bonded to the handle wafer. An optical membrane structure is formed in this device wafer. The insulating layer is selectively removed to release the membrane structure. This device wafer can be manufactured from silicon wafer material. Such material typically has a low number of dislocations yielding a stable mechanical membrane structure. The insulating layer defines the electrical cavity across which electrical fields are established that are used to electrostatically deflect the membrane structure. The insulating layer is between 3 and 6 micrometers ($\mu$m) in thickness.

7 Claims, 4 Drawing Sheets

OTHER PUBLICATIONS

Xiao, Z.; Engström, O; and Vidovic', N., "The Influence of Pressure on the Optical Properties of Artificial Microcavities in Silicon," Semiconductor Science and Technology, vol. 12 (1997) pp. 166–172.

Zhu, Z. H.; Ejeckam, Felix E.; Qian, Y.; Zhang, Jizhi; Zhang, Zhenjun; Christenson, Gina L.; and Lo, Y.H., "Wafer Bonding Technology and Its Applications in Optoelectronic Devices and Materials," IEEE Journal of Selected Topics in Quantum Electronics, vol. 3, No. 3, Jun. 1997.

Tran, et al., "Surface Micromachined Fabry–Perot Tunable Filter," IEEE Photonics Tech. Letters, vol. 8, No. 3, Mar. 1996 pp. 393–395.

* cited by examiner

SILICON ON INSULATOR OPTICAL MEMBRANE STRUCTURE FOR FABRY-PEROT MOEMS FILTER

RELATED APPLICATION

This application is a Continuation-in-Part of U.S. application Ser. No. 09/649,168, filed on Aug. 25, 2000, now U.S. Pat. No. 6,373,632 and claims the benefit of the filing date of Provisional Application No. 60/186,780, filed Mar. 3, 2000, the entire teachings of both of these applications being incorporated herein by this reference in their entirety.

BACKGROUND OF THE INVENTION

Micro-optical electromechanical system (MEOMS) membranes are used in a spectrum of optical applications. For example, they can be coated to be reflective and then paired with a stationary mirror to form a tunable Fabry-Perot (FP) cavity/filter. They can also be used as stand-alone reflective components to define the end of a laser cavity, for example.

The MEOMS membranes are typically produced by depositing a membrane structure over a sacrificial layer, which has been deposited on a support structure. This sacrificial layer is subsequently etched away to produce a suspended membrane structure in a release process.

Often the membrane layer is a silicon compound and the sacrificial layer can be polyimide, for example.

Typically, membrane deflection is achieved by applying a voltage between the membrane and a fixed electrode on the support structure. Electrostatic attraction moves the membrane in the direction of the fixed electrode as a function of the applied voltage. This results in changes in the reflector separation of the FP filter or cavity length in the case of a laser.

SUMMARY OF THE INVENTION

There are advantages associated with using crystalline membrane layers when making mechanical structures. They tend to be mechanically stable, not being susceptible to creep, for example, or other long-term degradation or changes in their optical, mechanical, or electromechanical performance. These characteristics are generally desirable in MOEMS-type devices, especially devices that are to be deployed in carrier-class systems since long term stability is an important metric for characterizing such devices.

In general, according to one aspect, the invention features a process for fabricating an optical membrane device. This process comprises providing a handle wafer and then oxidizing a surface of the handle wafer to form an insulating layer. A device wafer is then bonded to the handle wafer. An optical membrane structure is formed in this device wafer. The insulating layer is selectively removed to release the membrane structure. This device wafer can be manufactured from silicon wafer material. Such material typically has a low number of dislocations yielding a stable mechanical membrane structure.

Another important issue in MOEMS design concerns layer thickness. The design of such layers typically have optical as well as electromechancal constraints. For example, optical membranes must typically deflect a distance corresponding to the wavelength of light on which they operate. They are usually electrostatically deflected, however, and operating voltages can be limited by air ionization factors and voltages that are available from the systems in which they operate.

In general, according to another aspect, the invention concerns an optical membrane device. This device comprises handle wafer material. This functions as the mechanical support for the device. An optical membrane layer is provided in which a deflectable membrane structure is formed. An insulating layer separates the handle wafer material from the optical membrane layer. The insulating layer defines the electrical cavity, across which electrical fields are established that are used to electrostatically deflect the membrane structure. According to the invention, the insulating layer is between 3 and 6 micrometers ($\mu$m) in thickness.

In the preferred embodiment, the insulating layer is greater than 3 micrometers in order to ensure that "snap down", i.e., the unintentional contact between the membrane and another part of the device, is avoided. So that the device, however, can be operated with voltages with less than approximately 50 to 100 volts, the insulating layer is preferably less than 5 micrometers in thickness. From this information, the corresponding rigidity of the membrane is selected.

Concerning the preferred embodiment, the handle wafer material is preferably between 100 and 1000 micrometers in thickness. An optical port can also be provided, through the handle wafer, to enable direct optical access to the membrane structure without having to traverse through the wafer material. Preferably, to yield a proper balance between structural stability and deflectability, the optical membrane layer is between 5 and 10 micrometers in thickness. Presently, it is between 6 and 8 micrometers in thickness.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
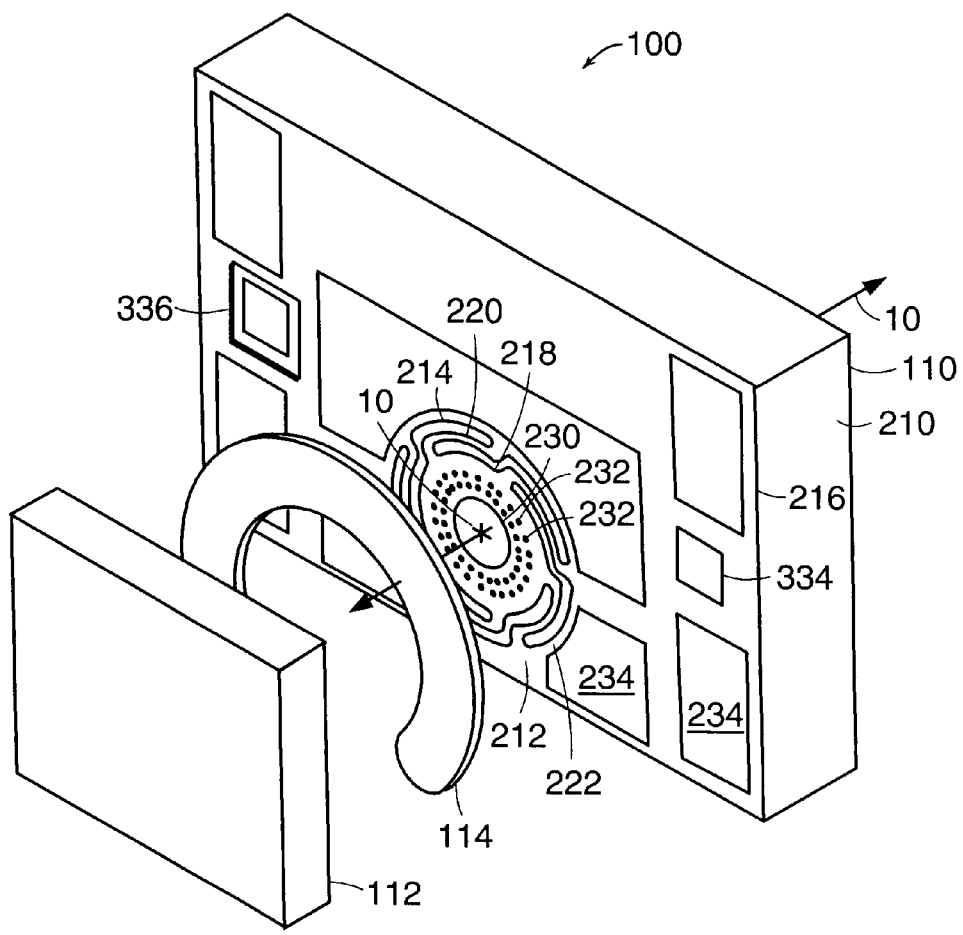
FIG. 1 is a perspective, exploded view of a tunable filter comprising an optical membrane device, according to the present invention.

FIG. 1 shows a Fabry-Perot (FP) tunable filter 100 comprising an optical membrane device 110, which has been constructed according to the principles of the present invention.

Generally, in the FP filter 100, a spacer device 114 separates the curved mirror device 112 from the membrane device 110 to thereby define a Fabry-Perot (FP) cavity.

The optical membrane device 110 comprises handle or support material 210. Preferably, the handle material is wafer material such as from a silicon handle wafer, which has been subsequently singulated into the illustrated device. The handle wafer material is between 100 and 1,000 micrometers thick. In the preferred embodiment, it is between 300 and 500 micrometers in thickness.

An optical membrane layer 212 is added to the handle wafer material 210. The membrane structure 214 is formed in this optical membrane layer 212. This optical membrane layer is between 5 and 10 micrometers in thickness. Preferably, it is between 6 and 8 micrometers in thickness.

An insulating layer 216 separates the optical membrane layer 212 from the handle wafer material 210. During manufacture, this insulating layer functions as a sacrificial/release layer, which is partially removed to release the membrane structure 214 from the handle wafer material 210. In the preferred embodiment, this insulating layer is between 3 and 6 micrometers in thickness. In the current embodiment, it is greater than 3 micrometers, preferably greater than 3.5 $\mu$m, in thickness, but less than 5 micrometers.

According to the invention, the membrane layer 212 is silicon. Currently, the membrane layer is manufactured from a silicon wafer that has been bonded to the insulating layer under elevated heat and pressure. In any case, the material of layer 212 has less than $10^9$ dislocations per square centimeter to yield a device with stable long-term behavior. Other alternatives are polycrystalline silicon, or essentially single crystal silicon, which have been deposited on the insulating layer.

In the current embodiment, the membrane structure 214 comprises a body portion 218. The optical axis 10 of the device 100 passes concentrically through this body portion 218 and orthogonal to a plane defined by the membrane layer 212. A diameter of this body portion 218 is preferably 300 to 600 micrometers, currently it is about 500 micrometers.

Tethers 220 extend radially from the body portion 218 to an outer portion 222, which comprises the ring where the tethers 220 terminate. In the current embodiment, a spiral tether pattern is used.

An optical coating dot 230 is typically deposited on the body portion 218 of the membrane structure 214. In the implementation as a Fabry-Perot filter or other reflecting membrane, the optical dot 230 is preferably a highly reflecting (HR) dielectric mirror stack. This yields a highly reflecting, but low absorption, structure that is desirable in, for example, the manufacture of high finesse Fabry-Perot filters.

In the illustrated embodiment, artifacts of the manufacture of the membrane structure 214 are etchant holes 232. These holes allow an etchant to pass through the body portion 218 of the membrane structure 214 to assist in the removal of the insulating layer 216 during the release process.

In the illustrated embodiment, metal pads 234 are deposited on the proximal side of the membrane device 110. These are used to solder bond, for example, the spacer device 114 onto the proximal face of the membrane device 110. Of course, it could be avoided if the spacing structure 114 is formed to be integral with the membrane device 110. Bond pads 234 are also useful when installing the filter 100 on a micro-optical bench, for example. Also provided are a membrane layer wire bond pad 334 and a handle wafer wire bond pad 336. The membrane layer bond pad is a wire bonding location for electrical control of the membrane layer. The handle wafer bond pad 336 is a wire bond pad for electrical access to the handle wafer material.

Figure 2:
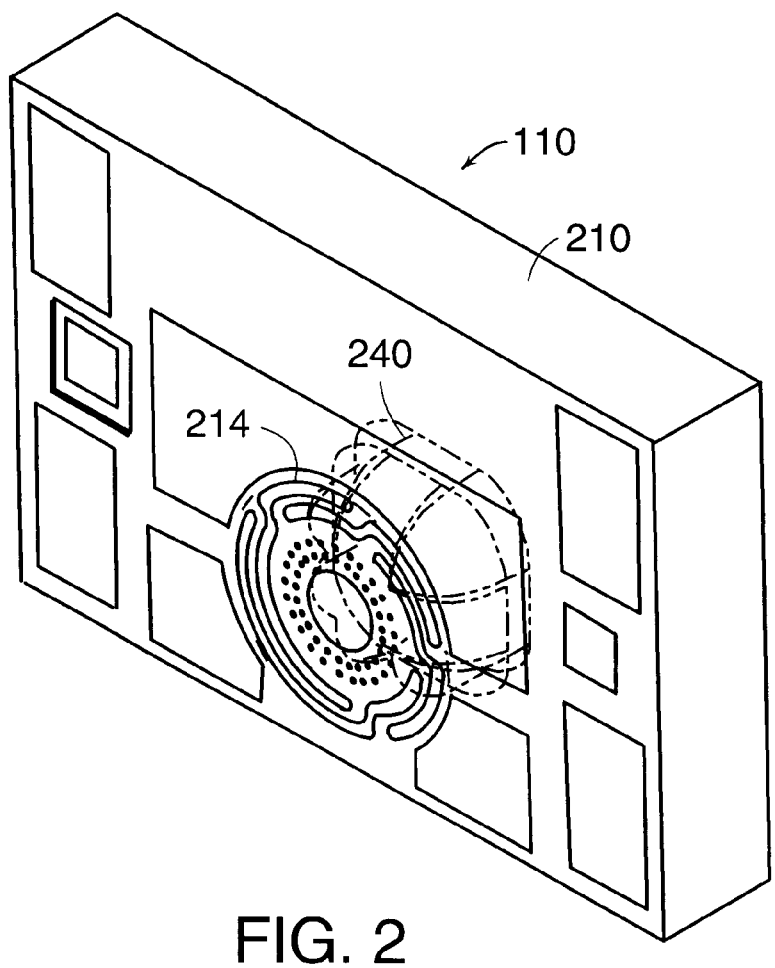
FIG. 2 is a perspective view of a proximal side of the inventive optical membrane device 110 showing the backside optical port 240, in phantom.

As illustrated in FIG. 2, an optical port 240 (shown in phantom) is provided, in some embodiments, extending from a distal side of the handle wafer material 210 to the membrane structure 214. Whether or not this optical port 214 is required depends upon the transmissivity of the handle wafer material 210 at the optical wavelengths over which the membrane device 110 must operate. Typically, with no port, the handle wafer material along the optical axis must be AR coated.

Figure 3:
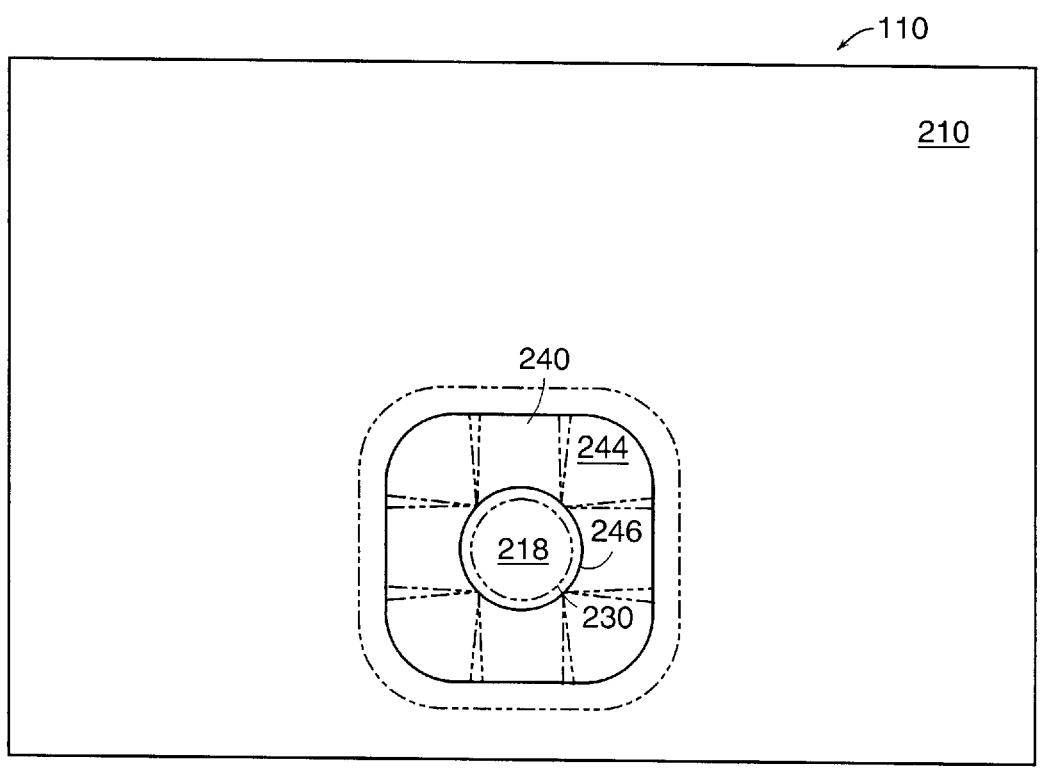
FIG. 3 is an elevation view of the distal side of the inventive optical membrane device showing the optical port.

FIG. 3 further shows the optical port 240 formed through the distal side of the handle wafer material 210 in the optical membrane device 110. Specifically, the optical port 240 has generally inward sloping sidewalls 244 that end in the port opening 246. As a result, looking through the distal side of the handle wafer material, the body portion 218 of the membrane structure can be observed and is preferably concentric with the optical coating 230.

FIGS. 4A through 4D illustrate a process for fabricating a membrane device according to the present invention.

Figure 4A:
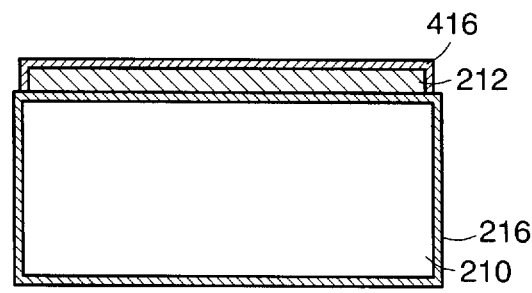
FIGS. 4A through 4D are schematic cross-sectional views illustrating a process for fabricating a membrane device according to the present invention.

Referring to FIG. 4A, the process begins with a support or handle wafer 210, which in one embodiment is a standard n-type doped silicon wafer. The handle wafer 210 is 75 mm to 150 mm in diameter, for example.

The wafer 210 is oxidized to form the sacrificial insulating layer 216. The sacrificial insulating layer 216 defines the electrostatic cavity length. Design rules for electrostatic cavities typically dictate that the membrane can only be deflected across approximately one-third of the cavity length. Larger deflections can result in snap down, where the membrane moves in an uncontrolled fashion to contact the stationary electrostatic electrode. Further, for typical wavelength division multiplexing (WDM) and dense WDM (DWDM) applications, such membranes need to be deflectable by at least one-half of an operational wavelength of the tunable filter. For C and L band DWDM systems, such membranes need to deflect at least (0.5) 1620 nanometers (nm). These principles yield cavity length designs of approximately of 2.5 $\mu$m and longer.

With existing process control capabilities, the thickness of insulating layer 216 is generally limited to less than 3 $\mu$m, when the further objective of minimizing the total electrostatic deflection voltage is reflected in the insulating layer design.

Experimentation with fabricated devices has demonstrated, however, that sacrificial insulating layers of less than 3 $\mu$m are still insufficient to yield the necessary deflection distances while adequately avoiding the risk of snap-down. As a result, according to the present invention, the insulating layer is 216 is thicker than 3.0 $\mu$m. Presently, the preferred embodiment uses an oxide thickness of 3.5 $\mu$m or greater. To yield reasonable operating voltages, however, the layer is preferably less than 6 $\mu$m in thickness. Currently, the layer is less than 5 $\mu$m. Specifically, the current thickness is 4.0 $\mu$m+/−0.5%.

The membrane layer 212 is then installed on the sacrificial insulating layer 216. Preferably, the membrane layer 212 is 6 to 10 $\mu$m in thickness. Such thickness range provides adequate structural integrity while not making the structure overly rigid or brittle.

In a current process, a membrane wafer such as a doped silicon wafer is bonded to the oxide layer using elevated temperature and pressure. This process yields a highly-crystalline membrane structure with the associated advantages. Preferably, the wafer material has less than $10^9$ dislocations per square centimeter.

After bonding, the membrane layer 212 is annealed and polished back to the desired membrane thickness, if necessary. A thin oxide layer 416 is preferably then grown on the membrane layer 212 to function as an etch protection layer.

Figure 4B:
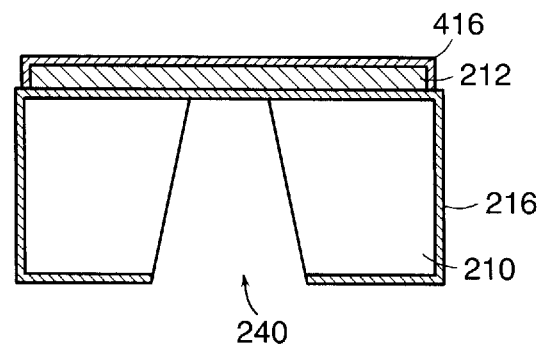

As shown in FIG. 4B, the optical port 240 is patterned and etched into the handle or support wafer 210 in a backside etch process, preferably using a combination of isotropic and anisotropic etching. The sacrificial insulating layer 216 is used as an etch stop.

Alternatively, the optical port etch step can be omitted, as silicon is partially transparent at infrared wavelengths. In such implementation, an anti-reflective (AR) coating is applied to the outer surface of handle wafer 210 and other air-silicon interfaces to minimize reflection from the interfaces.

Figure 4C:
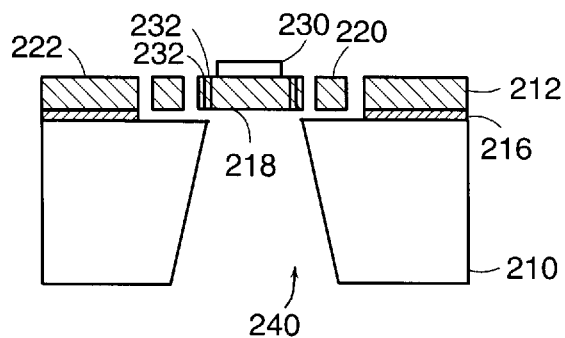

FIG. 4C shows the installation of the highly reflective (HR) spot 230. Specifically, the HR spot 230 is formed by depositing and etching-back using a patterned photoresist layer. The HR coating is preferably a multi-layer coating of 4 more layers, preferably 8 or more, with a 16 dielectric layer mirror being used in the current embodiment. The preferred method of etching the dielectric coatings 230 is to use a dry etch process, such as reactive ion etching and reactive ion milling.

Also shown is the formation membrane structure including the tethers 220, membrane body 218 and outer portion 222 in the membrane layer 212. Specifically, a photoresist layer is deposited and patterned with the membrane structure pattern. It also functions to protect the HR spot 230, in one embodiment. Thereafter, the release process is performed in which an etchant is used to remove the insulation layer 212 from underneath the membrane structure.

Figure 4D:
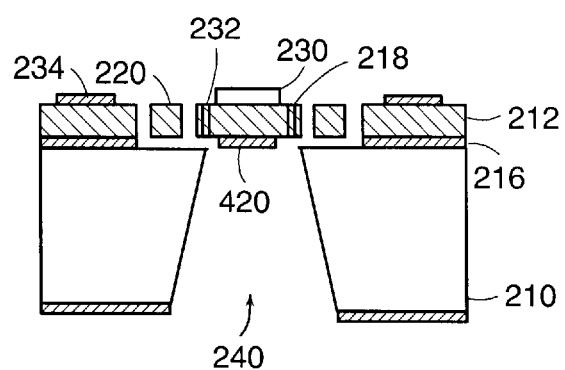

Finally as shown in FIG. 4D, an anti-reflection (AR) coating 420 is deposited through the optical port 240 onto the exterior surface of the membrane. Further, metal pads 234 are added.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical membrane device comprising:
   a handle wafer material;
   an optical membrane layer in which a deflectable membrane structure is formed, wherein the optical membrane layer is between 5 and 10 micrometers in thickness;
   a solid insulating layer separating the handle wafer material from the optical A membrane layer that defines an electrical cavity across which electrical fields are established to deflect the membrane structure;
   wherein the insulating layer is between 3 and 6 micrometers in thickness.

2. An optical membrane device as claimed in claim 1, further comprising
   an optical port in the handle wafer material.

3. An optical membrane device as claimed in claim 1, wherein the handle wafer material is between 100 and 1000 micrometers thick.

4. An optical membrane device as claimed in claim 1, wherein the optical membrane layer comprises device wafer material tat has been mechanically bonded to the insulating layer.

5. An optical membrane device as claimed in claim 1, wherein the optical membrane layer comprises polycrystalline silicon.

6. An optical membrane device as claimed in claim 1, wherein the optical membrane layer comprises silicon nitride.

7. An optical membrane device comprising:
   a handle wafer material;
   an optical membrane layer in which a deflectable membrane structure is formed, wherein the optical membrane layer is between 6 and 8 micrometers in thickness;
   a solid insulating layer separating the handle wafer material from the optical membrane layer that defines an electrical cavity across which electrical fields are established to deflect the membrane structure;
   wherein the insulating layer is between 3 and 6 micrometers in thickness.

* * * * *

UNITED STATES PATENT AND TRADEMARK OFFICE
CERTIFICATE OF CORRECTION

PATENT NO. : 6,608,711 B2  Page 1 of 1
DATED : September 9, 2003
INVENTOR(S) : Flanders et al.

It is certified that error appears in the above-identified patent and that said Letters Patent is hereby corrected as shown below:

Column 6,
Line 11, delete -- A --;
Line 24, delete "tat" and insert -- that --;

Signed and Sealed this

Fourth Day of November, 2003

JAMES E. ROGAN
*Director of the United States Patent and Trademark Office*